United States Patent [19]

Kuramoto et al.

[11] Patent Number: 5,212,232
[45] Date of Patent: May 18, 1993

[54] PROCESS FOR PRODUCTION OF STYRENE-BASED POLYMERS

[75] Inventors: Masahiko Kuramoto; Hiroshi Maezawa, both of Ichihara; Hiroshi Hayashi, Chiba, all of Japan

[73] Assignee: Idemitsu Kosan Co., Ltd., Tokyo, Japan

[21] Appl. No.: 771,783

[22] Filed: Oct. 3, 1991

Related U.S. Application Data

[63] Continuation of Ser. No. 358,385, May 11, 1989, abandoned.

[30] Foreign Application Priority Data

Sep. 28, 1987 [JP] Japan .................. 62-240981
Oct. 2, 1987 [JP] Japan .................. 62-247986

[51] Int. Cl.$^5$ ............................ C08K 3/08; C08F 4/64
[52] U.S. Cl. .................... 524/779; 524/783; 524/785; 524/786; 524/788; 524/790; 526/160
[58] Field of Search ............ 524/788, 700, 786, 714, 524/745, 779, 783, 785, 790, 796

[56] References Cited

U.S. PATENT DOCUMENTS 3,864,427  2/1975  Nakane et al. .............. 525/170
4,447,475  5/1984  Lubbock et al. .
4,680,353  7/1987  Ishihara et al. .............. 526/160

FOREIGN PATENT DOCUMENTS 210615   4/1987   European Pat. Off. .
46-8988  3/1971   Japan .
58-35602 8/1983   Japan .
60-26011 2/1985   Japan .
62-257948 11/1987 Japan .
62-257950 11/1987 Japan .

*Primary Examiner*—John C. Bleutge
*Assistant Examiner*—Mark D. Sweet
*Attorney, Agent, or Firm*—Oblon, Spivak, McClelland, Maier & Neustadt

[57] ABSTRACT

A process for producing a styrene-based polymer, particularly a styrene-based polymer having mainly a syndiotactic structure by polymerizing a styrene-based monomer in the presence of a filler by using a catalyst containing (A) a titanium compound and (B) aluminoxane as main components. The filler acts as a catalyst carrier, increasing catalyst activity, and thus de-ashing treatment is not needed. When the filler is used in a large amount, there is obtained a composition in which the filler is uniformly dispersed in the styrene-based polymer. The styrene-based polymer or styrene-based polymer-containing composition is excellent in heat resistance and chemical resistance.

8 Claims, No Drawings

PROCESS FOR PRODUCTION OF STYRENE-BASED POLYMERS

This application is a continuation of U.S. patent application Ser. No. 07/358,385, filed May 11, 1989 now abandoned, which is the U.S. designated application of PCT/JP88/00973 filed Sep. 24, 1988.

DESCRIPTION

1. Technical Field

The present invention relates to a process for production of styrene-based polymers. More particularly, it is concerned with a process for efficiently producing styrene-based polymers having mainly a syndiotactic structure by polymerizing styrene-based monomers in the presence of a filler by the use of a specified catalyst and further to a process for preparing a uniform composition in dispersion of the above styrene-based polymer and filler.

2. Background Art

The present inventors succeeded in producing styrene-based polymers having a syndiotactic structure by polymerizing styrene-based monomers using a catalyst comprising a titanium compound and aluminoxane (Japanese Patent Application Laid-Open Nos. 104818/1987 and 187708/1987, and U.S. Pat. No. 4680353).

As a result of further investigations, it has been revealed that it is necessary to use a large amount of the above catalyst in producing styrene-based polymers because its polymerization activity is insufficient, and accordingly that de-ashing treatment must be applied after the production of styrene-based polymers and the load of the de-ashing treatment is undesirably increased.

Compositions containing the above styrene-based polymers and various fillers are known as described in Japanese Patent Application Laid-Open Nos. 257948/1987 and 259402/1987. In preparation of the composition, however, the styrene-based polymer and the filler should be kneaded at a high temperature because the melting point of the styrene-based polymer is high. This high temperature kneading will lead to a decrease in the molecular weight of the styrene-based polymer and it is difficult to avoid scattering of the filler at the time of compounding. Moreover, it is difficult to prepare a uniform composition in dispension.

Thus the present inventors made extensive investigations to overcome the above problems encountered in the production of styrene-based polymers and to develop; (1) a process for production of styrene-based polymers in which catalytic activity is increased, accordingly the load of the de-ashing treatment can be reduced and furthermore the productivity of the styrene-based polymers can be increased and (2) a process for preparation of a composition in which a filler is uniformly dispersed in the styrene-based polymers.

An object of the present invention is to provide a process for efficiently producing styrene-based polymers, specifically styrene-based polymers having mainly a syndiotactic structure.

Another object of the present invention is to provide a process for efficiently producing styrene-based polymers, specifically styrene-based polymers having mainly a syndiotactic structure, in which catalytic activity is increased and thus the load of the de-ashing treatment can be reduced.

Still another object of the present invention is to provide a process for efficiently preparing a uniform composition in dispersion of styrene-based polymers, specifically styrene-based polymers having mainly a syndiotactic structure, and a filler.

DISCLOSURE OF INVENTION

The present invention provides a process for producing a styrene-based polymer or a styrene-based polymer composition which comprises polymerizing styrene-based monomers in the presence of a filler using a catalyst containing (A) a titanium compound and (B) aluminoxane.

The catalyst to be used in the present invention contains (A) a titanium compound and (8) aluminoxane as main components.

Various titanium compounds can be used as component (A). Preferably at least one compound selected from the group consisting of titanium compounds and titanium chelate compounds represented by the general formula (I) or (II) is used:

$$TiR^1_a R^2_b R^3_c R^4_{4-(a+b+c)} \quad (I)$$

$$TiR^1_d R^2_e R^4_{3-(d+e)} \quad (II)$$

wherein $R^1$, $R^2$, $R^3$ and $R^4$ are each hydrogen, an alkyl group having 1 to 20 carbon atoms, an alkoxy group having 1 to 20 carbon atoms, an aryl group having 6 to 20 carbon atoms, an alkylaryl group, an arylalkyl group, an acyloxy group having 1 to 20 carbon atoms, a cyclopentadienyl group, a substituted cyclopentadienyl group, an indenyl group, or halogen, a, b and c are each an integer of 0 to 4, and d and e are each an integer of 0 to 3.

$R^1$, $R^2$, $R^3$ and $R^4$ of the general formulae (I) and (II) are each hydrogen, an alkyl group having 1 to 20 carbon atoms (specifically, a methyl group, an ethyl group, a propyl group, a butyl group, an amyl group, an isoamyl group, an isobutyl group, an octyl group, a 2-ethylhexyl group, and the like), an alkoxy group having 1 to 20 carbon atoms (specifically, a methoxy group, an ethoxy group, a propoxy group, a butoxy group, an amyloxy group, a hexyloxy group, a 2-ethylhexyloxy group, and the like), an aryl group having 6 to 20 carbon atoms, an alkylaryl group, an arylalkyl group (specifically, a phenyl group, a tolyl group, a xylyl group, a benzyl group, and the like), an acyloxy group having 1 to 20 carbon atoms (specifically, a heptadecylcarbonyloxy group, and the like), a cyclopentadienyl group, a substituted cyclopentadienyl group (specifically, a methylcyclopentadienyl group, a 1,2-dimethylcyclopentadienyl group, a pentamethylcyclopentadienyl group, and the like), an indenyl group or halogen (e.g., chlorine, bromine, iodine and fluorine). $R^1$, $R^2$, $R^3$ and $R^4$ may be the same or different.

a, b and c are each an integer of 0 to 4.

d and e are each an integer of 0 to 3.

Representative examples of the tetra-valent titanium compounds and titanium chelate compounds represented by the general formula (I) are methyltitanium trichloride, titanium tetramethoxide, titanium tetraethoxide, titanium monoisopropoxytrichloride, titanium diisopropoxydichloride, titanium triisopropoxymonochloride, tetra(2-ethylhexyloxy) titanium, cyclopetadienyltitanium trichloride, biscyclopentadienyltitanium dichloride, cyclopentadienyltitanium trimethoxide, cyclopentadienyl trimethyltitanium, pentamethylcyclopentadienyltitanium trimethoxide, pentamethylcyclopentadienyl trimethyltitanium, titanium tetrachloride, titanium tetrabromide, bis(2,4-pentanedionate)titanium oxide, bis(2,4-pentanedionate)titanium dichloride, bis(2,4-pentanedionate)titanium dibutoxide, and the like.

In addition, as the titanium compound of component (A), condensed titanium compounds represented by the general formula (III):

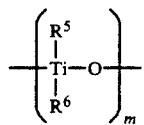

(wherein $R^5$, $R^6$ are each halogen atom, an alkoxy group having 1 to 20 carbon atoms, or an acyloxy group, and m is 2 to 20) can be used.

In addition, the complexes of the above titanium compounds and esters, ethers or the like can be used.

Typical examples of the tri-valent titanium compounds represented by the general formula (II) are titanium trihalide, e.g., titanium trichloride, cyclopentadienyltitanium compounds, e.g., cyclopentadienyltitanium dichloride, and the like. In addition, compounds resulting from reduction of tetra-valent titanium compounds can be used. These tri-valent titanium compounds can be used as complexes with esters, ethers and the like.

Aluminoxane is used as component (B) in combination with the titanium compound of component (A). More specifically, alkylaluminoxane represented by the general formula (IV):

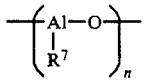

(wherein $R^7$ is an alkyl group having 1 to 8 carbon atoms, and n is 2 to 50) can be used.

This alkylaluminoxane can be prepared by various methods. For example, (1) a method in which alkylaluminum is dissolved in an organic solvent and then contacted with water, (2) a method in which alkylaluminum is first added at the time of polymerization and then water is added, and (3) a method in which water of crystallization contained in metal salts and the like, or water adsorbed on inorganic or organic materials is reacted with alkylaluminum can be employed. The above water may contain ammonia, amines such as ethylamine, sulfur compounds such as hydrogen sulfide, phosphorous compounds such as phosphorous esters, and so on in the proportion of less than 20%.

The catalyst to be used in the present invention contains the above titanium compound (A) and aluminoxane (B) as the main components. To the catalyst, if necessary, other catalyst components, e.g., trialkylaluminum represented by the general formula:

$AlR^8{}_3$ (wherein $R^8$ is an alkyl group having 1 to 8 carbon atoms), and other organometallic compounds can be added.

The desired styrene-based polymer having mainly a syndiotactic structure cannot be obtained with catalysts which do not contain either the titanium compound (A) or aluminoxane (B) as their main components.

The ratio of component (A) to component (B) in the catalyst varies with the type of each catalyst component, the type of the styrene-based monomer as the starting material, and so on, and cannot be determined unconditionally. Usually, the ratio of aluminum in component (A) to titanium in component (B), i.e., aluminum/titanium (molar ratio) is 1/1 to $1 \times 10^6/1$ and preferably 10/1 to $1 \times 10^4/1$.

The styrene-based monomer to be polymerized in the process of the present invention includes styrene and its derivatives. Examples of such styrene derivatives are alkylstyrene such as methylstyrene, ethylstyrene, butylstyrene, p-tert-butylstyrene, dimethylstyrene and the like, halogenated styrene such as chlorostyrene, bromostyrene, fluorostyrene and the like, halogen-substituted alkylstyrene such as chloromethylstyrene and the like, alkoxystyrene such as methoxystyrene and the like, carboxymethylstyrene, alkyletherstyrene, alkylsilylstyrene, vinylbenzenesulfonic acid ester, vinylbenzylalkoxy phosphite, and the like.

In accordance with the process of the present invention, styrene-based monomers are polymerized using the above catalyst containing the titanium compound (A) and the aluminoxane (B) as the main components, and furthermore the polymerization reaction is carried out in the presence of a filler. It suffices that the filler is present in the reaction system in the course of the polymerization reaction. It is preferred that the filler first be brought into contact with either or both of components (A) and (B).

In specific embodiments of the process in the present invention; (1) the filler is first contacted with the aluminoxane as component (B) of the catalyst and then with the titanium compound as component (A) and, thereafter, the styrene-based monomer is added and polymerized, (2) the filler is first contacted with the titanium compound as component (A) of the catalyst and then with the aluminoxane as component (B) and, thereafter, the styrene-based monomer is added and polymerized, and (3) the titanium compound as component (A) of the catalyst and the aluminoxane as component (B) are first contacted with each other and then the filler is contacted therewith and, thereafter, the styrene-based monomer is added and polymerized. Of these methods, method (1) is particularly suitable from a viewpoint of catalytic activity.

It is also advantageous that the filler be treated with organometallic compounds such as trialkylaluminum, dialkylmagnesium and the like prior to its contact with components (A) and (B) of the catalyst.

The amount of the filler present in the reaction system is not critical. The amount of the filler supplied when it is used as a support for the catalyst is substantially different from that when it is expected to act both as a support for the catalyst and as a filler.

In general, the amount of the filler added is 0.1 to 85% by weight and preferably 1 to 50% by weight based on the total product weight (styrene-based polymer+filler). Particularly when the filler is used as a support for the catalyst, it suffices that the amount of the filler added be 0.1 to 20% by weight, preferably 0.5 to 15% by weight based on the total product weight.

The filler content of the product can be controlled by regulating polymerization conditions (e.g., time, temperature, catalyst, etc.). Thus, the amount of the filler in the reaction system is determined appropriately depending on conditions in which reaction proceeds.

Various fillers can be used, and the type is determined appropriately depending on the purpose of use of the product and so forth. Specific examples of the fillers are inorganic oxides such as silica, alumina, silica alumina, quick lime, magnesia, titania, triiron tetraoxide, zirconia and the like, metals such as copper, aluminum, nickel, iron, tin and the like, plated materials such as nickel-plated mica and the like, inorganic salts or metal salts such as magnesium sulfate, calcium sulfate, ferric sulfate, calcium carbonate, barium carbonate, potassium titanate, magnesium carbonate, magnesium hydroxide, aluminum hydroxide, molybdenum disulfide, iron sulfide and the like, ceramics such as silicon carbide, chromium carbide, titanium carbide, zirconium carbide, boron carbide, silicon nitride, boron nitride and the like, organic pigments such as phthalocyanine blue, phthalocyanine green and the like, carbon black such as furnace black, acetylene black, ketchen black and the like, graphite, talc, mica, sericite, baryta, kaolin, agamatolite, feldspar, vermiculite, hydrobiotite, diatomaceous earth, various foaming agents, glass fibers, carbon fibers, stainless steel fibers, gypsum fibers, potassium titanate fibers, magnesium sulfate fibers, various metal fibers, and the like.

The size of the filler varies with its type, the amount blended, and so forth, and cannot be determined unconditionally. In general, for spherical fillers, the average diameter is 0.01 to 200 μm and preferably 0.1 to 100 μm, and for fibrous fillers, the average diameter is 0.1 to 10,000 μm, preferably 1 to 3,000 μm, and L/D(length-/diameter) is 10 to 2,000.

For improving catalitic activity, inorganic oxides, such as α-alumina, γ-alumina, magnesia, quick lime, titania, triiron tetraoxide and zirconia having an average diameter of 1.0 to 100 μm are preferable. For producing a composition in which a filler is uniformly dispersed, carbon black with an average diameter of 0.1 to 50 μm, copper powder with an average diameter of 0.1 to 200 μm, phthalocyanine green with an average diameter of 0.5 to 50 μm, calcium carbonate with an average diameter of 0.01 to 50 μm, silicon carbide with an average diameter of 0.1 to 100 μm, talc with an average diameter of 0.1 to 50 μm, mica with an average diameter of 10 to 80 μm, silica with an average diameter of 0.01 to 0.2 μm, glass fiber with an aspect ratio of 10 to 1000 and a diameter of 3 to 20 μm, and carbon fiber with an aspect ratio 10 to 500 and a diameter of 5 to 20 μm, are preferable.

The molecular weight of the styrene-based polymer can be easily controlled by suitably choosing polymerization conditions (e.g., temperature, the type of catalyst, and so forth). Thus, depending on the desired molecular weight, polymerization conditions are appropriately determined.

The polymerization reaction in the process of the present invention may be bulk polymerization, or it may be carried out in aliphatic hydrocarbons such as benzene, pentane, hexane, heptane and the like, alicyclic hydrocarbons such as cyclohexane and the like, aromatic hydrocarbons such as toluene, xylene and the like, or mixtures thereof.

The polymerization temperature is not critical, and it is usually 0° to 90° C. and preferably 20° to 70° C.

The styrene-based polymers to be produced by the present invention have mainly a syndiotactic structure.

"Having mainly a syndiotactic structure" means that the polymer has a structure with a configuration that is mainly syndiotactic, i.e., the stereo structure in which phenyl or substituted-phenyl groups as side chains are positioned alternately in opposite directions relative to the main chain comprising carbon-carbon bonds. The tacticity is quantitatively determined by the nuclear magnetic resonance method using carbon isotope ($^{13}$C-NMR method). The tacticity as determined by the $^{13}$C-NMR method can be indicated by the proportion of a plurality of continuing constitutional units, for example, diad in which two constitutional units are continuing, triad in which three constitutional units are continuing, or pentad in which five constitutional units are continuing. The styrene-based polymers having mainly the syndiotactic structure as used herein are; polystyrene, poly(alkylstyrene), poly(halogenated styrene), poly(alkoxystyrene), poly(vinyl benzoate) and their mixtures, or copolymers containing the above monomers as the major component, having syndiotacticity that the diad is at least 75% and preferably at least 85%, or the pentad (racemic pentad) is at least 30% and preferably at least 50%. Specific examples of the poly(alkylstyrene) are poly(methylstyrene), poly(ethylstyrene), poly(isopropylstyrene), poly(tert-butylstyrene) and the like. Specific examples of the poly(halogenated styrene) are poly(chlorostyrene), poly(bromostyrene), poly(fluorostyrene) and the like, Specific examples of the poly(alkoxystyrene) are poly(methoxystyrene), poly(ethoxystyrene) and the like. Particularly preferred styrene-based polymers are polystyrene, poly(p-methylstyrene), poly(m-methylstyrene), poly(p-tertbutylstyrene), poly(p-chlorostyrene), poly(m-chlorostyrene), poly(p-fluorostyrene), a styrene/p-methylstyrene copolymer.

The present invention is described in greater detail with reference to the following examples.

EXAMPLE 1

(1) (B) Preparation of Aluminoxane 200 ml of toluene was placed in a reactor, and 47.4 ml (492 millimoles) of trimethylaluminum and 35.5 g (142 millimoles) of copper sulfate pentahydrate ($CuSO_4 \cdot 5H_2O$) were added and reacted in a stream of argon at 20° C. for 24 hours.

Copper sulfate was removed from the above reaction mixture by filtration, and the toluene was distilled away to obtain 12.4 g of methylaluminoxane. The molecular weight of the methylaluminoxane as determined by the benzene freezing point depression method was 721.

(2) Production of Styrene-Based Polymer 100 ml of toluene, 0.5 g of α-alumina having a particle diameter of 30 μm as a filler, and 15 millimoles (as aluminum atom) of the methylaluminoxane as obtained in (1) above were placed in a 500-milliliter reactor which had been purged with argon and stirred at room temperature for 10 minutes. Then, 0.025 millimole of cyclopentadienyltitanium trichloride was added and the resulting mixture was heated to 50° C., and 15.6 g of a styrene monomer was introduced and polymerized at 50° C. for one hour.

After the reaction was completed, the product was washed with a mixture of hydrochloric acid and methanol to decompose and remove the catalyst component and then dried to obtain 11.5 g of a styrene-based polymer (polymer 11 g, α-alumina 0.5 g). Along with the yield of the styrene-based polymer, the conversion of the styrene monomer in the reaction is shown in Table 1.

A nuclear magnetic resonance spectral analysis using carbon isotope ($^{13}$C-NMR) confirmed that the styrene-based polymer as obtained above was syndiotactic polystyrene.

EXAMPLES 2 TO 8

Styrene-based polymers were produced in the same manner as in (2) of Example 1 except that the type and amount of filler were changed. The results are shown in Table 1.

REFERENCE EXAMPLE 1

A styrene-based polymer was produced in the same manner as in (2) of Example 1 except that filler was not used. The results are shown in Table 1.

TABLE 1

| | Filler | | | Styrene-Based Polymer | | |
|---|---|---|---|---|---|---|
| | Type | Average Diameter (μm) | Amount (g) | Yield (g) | Polymer Yield (g) | Monomer Conversion (%) |
| Example 1 | α-Alumina | 30 | 0.5 | 11.5 | 11.0 | 70 |
| Example 2 | α-Alumina | 30 | 1.0 | 10.5 | 9.5 | 61 |
| Example 3 | γ-Alumina | 20 | 0.5 | 9.4 | 8.9 | 57 |
| Example 4 | Magnesia | 50 | 0.5 | 11.0 | 10.5 | 67 |
| Example 5 | Quick lime | 10 | 0.5 | 9.8 | 9.8 | 60 |
| Example 6 | Titania | 5 | 0.5 | 12.6 | 12.1 | 77 |
| Example 7 | Titania | 5 | 1.0 | 13.5 | 12.5 | 80 |
| Example 8 | Triiron tetraoxide | 60 | 0.5 | 16.0 | 15.5 | 99 |
| Reference Example 1 | — | — | — | 7.3 | 7.3 | 47 |

EXAMPLE 9

100 ml of toluene, 0.5 g of acetylene black as a filler, and 15 millimoles (as aluminum atom) of the methylaluminoxane as obtained in (1) of Example 1 were placed in a 500-milliliter flask which had been purged with argon and stirred at room temperature for 10 minutes. Then, 0.025 millimole of cyclopentadienyltitanium trichloride was added and the resulting mixture was heated to 50° C., and then styrene was introduced and polymerized at 50° C. for one hour.

After the reaction was completed, the product was washed with a mixture of hydrochloric acid and methanol to decompose and remove the catalyst component, and then dried to obtain 7.6 g of a styrene-based polymer composition containing acetylene black having an average diameter of 10 μm. The polymer and filler contents in the styrene-based polymer composition, and the conversion of the styrene monomer are shown in Table 2.

A $^{13}$C-NMR analysis confirmed that the polymer contained in the composition was syndiotactic polystyrene. The styrene-based polymer composition as obtained above was injection molded to produce a test piece. Mechanical properties were measured using the test piece. The results are shown in Table 2.

EXAMPLES 10 TO 15

Styrene-based polymers were prepared in the same manner as in (2) of Example 1 except that in Example 9, the type and amount of filler were changed as shown in Table 2. The results are shown in Table 2.

EXAMPLE 16

A styrene-based polymer composition was prepared in the same manner as in Example 9 except that 1.0 g of silicon carbide having an average diameter of 20 μm was used in place of the acetylene black as the filler, and the amount of the cyclopentadienyltitanium trichloride was changed to 0.05 millimole. The results are shown in Table 2.

EXAMPLE 17

100 ml of toluene and 1.0 g of silicon carbide having an average diameter of 20 μm were placed in a 500-milliliter flask which had been purged with argon, and 20 ml of a toluene solution of 15 millimoles (as aluminum atom) of the methylaluminoxane obtained in (1) of Example 1 and 0.025 millimole of cyclopentadienyltitanium trichloride which had been mixed previously was introduced in the reactor at room temperature. The resulting mixture was heated to 50° C., and then 15.6 g of a styrene monomer was introduced and polymerized at 50° C. for one hour.

After the reaction was completed, the product was washed with a mixture of hydrochloric acid and methanol to decompose and remove the catalyst component and then dried to obtain 6.3 g of styrene-based polymer composition containing silicon carbide. The results are shown in Table 2.

COMPARATIVE EXAMPLE 1

The styrene-based polymer as obtained in Reference Example 1 was injection molded to obtain a test piece. Mechanical properties were measured using this test piece. The results are shown in Table 2.

COMPARATIVE EXAMPLE 2

186 g of the styrene-based polymer as obtained in Reference Example 1 and acetylene black were thoroughly kneaded at 300° C. with a twin-screw kneader, and the resulting composition was injection molded to obtain a test piece. Mechanical properties were measured using the test piece. The results are shown in Table 2.

COMPARATIVE EXAMPLE 3

The procedure of Comparative Example 2 was repeated with the exception that 150 g of the styrene-based polymer and 50 g of copper powder were used. The results are shown in Table 2.

COMPARATIVE EXAMPLE 4

The procedure of Comparative Example 2 was repeated with the exception that 194 g of the styrene-based polymer and 6 g of phthalocyanine green were used. The results are shown in Table 2.

COMPARATIVE EXAMPLE 5

The procedure of Comparative Example 2 was repeated with the exception that 192 g of the styrene-based polymer and 8 g of calcium carbonate were used. The results are shown in Table 2.

COMPARATIVE EXAMPLE 6

The procedure of Comparative Example 2 was repeated with the exception that 176 g of the styrene-based polymer and 24 g of silicon carbide were used. The results are shown in Table 2.

consequently problems such as reduction in the molecular weight of the styrene-based polymer and filler scattering at the time of compounding can be avoided.

Therefore the styrene-based polymer or composition containing the styrene-based polymer as obtained by the process of the present invention can be widely and effectively used as materials for applications in which heat resistance and chemical resistance are required, and further as resin modifying materials.

We claim:

1. In a process for producing a styrene-based polymer having mainly a syndiotactic structure, the improve-

TABLE 2

| | Filler | | | Composition | | Mechanical Properties | |
|---|---|---|---|---|---|---|---|
| | Type | Average Diameter (μm) | Amount (g) | Yield (g) | Filler Content (wt %) | Modulus in Tension (kg/cm$^2$) | Tensile Strength (kg/cm$^2$) |
| Example 9 | Acetylene black | 10 | 0.5 | 7.6 | 6.6 | 45,000 | 880 |
| Example 10 | Acetylene black | 10 | 1.0 | 6.2 | 19.2 | 53,000 | 910 |
| Example 11 | Copper powder | 100 | 0.5 | 1.9 | 26.0 | 72,000 | 920 |
| Example 12 | Phthalocyaine green | 5 | 0.5 | 7.2 | 3.0 | 43,000 | 900 |
| Example 13 | Calcium carbonate | 10 | 0.5 | 11.9 | 4.2 | 45,000 | 890 |
| Example 14 | Silicon carbide | 20 | 0.5 | 10.0 | 5.0 | 46,000 | 870 |
| Example 15 | Silicon carbide | 20 | 5.0 | 11.9 | 41.9 | 83,000 | 930 |
| Example 16 | Silicon carbide | 20 | 1.0 | 9.0 | 11.2 | 53,000 | 910 |
| Example 17 | Silicon carbide | 20 | 1.0 | 6.3 | 15.9 | 57,000 | 880 |
| Comparative Example 1 | — | — | — | — | — | 35,000 | 550 |
| Comparative Example 2 | Acetylene black | 30 | 14*1 | 200*2 | 7.0 | 42,000 | 780 |
| Comparative Example 3 | Copper powder | 100 | 50*1 | 200*2 | 25.0 | 70,000 | 750 |
| Comparative Example 4 | Phthalocyaine green | 5 | 6*1 | 200*2 | 3.0 | 43,000 | 720 |
| Comparative Example 5 | Calcium carbonate | 10 | 8*1 | 200*2 | 4.0 | 45,000 | 730 |
| Comparative Example 6 | Silicon carbide | 20 | 24*1 | 200*2 | 12.0 | 51,000 | 730 |

*1 Amount of the filler for compounding
*2 Yield of the composition after kneading

INDUSTRIAL APPLICABILITY

In accordance with the process of the present invention, as described above, styrene-based polymers (e.g., polystyrene, polyalkylstyrene, polyhalogenatedstyrene, and the like) having the configuration that the side chains are mainly in the syndiotactic structure (diad at least 85%, or pentad at least 35%) can be produced efficiently because the catalyst is activated. Furthermore the styrene-based polymers thus obtained have excellent physical properties without application of post-treatment such as removal of the filler and so on. A styrene-based polymer composition with uniformly dispersed filler is obtained when a relatively large amount of filler is used.

In accordance with the process of the present invention, as described above, the styrene-based polymers having mainly syndiotactic structure can be obtained efficiently, and also the filler is uniformly dispersed in the styrene-based polymer composition. This composition has high heat resistance and is excellent in solvent resistance as compared with atactic polystyrene commonly used. Since the filler is incorporated in the course of forming the styrene-based polymer, it is uniformly dispersed at the time of formation composition of the styrene-based polymer. Thus, high temperature kneading is not needed in preparing the composition and ment comprises polymerizing a styrene-based monomer in the presence of 0.1 to 85% by weight, based on total product weight, of filler selected from the group consisting of silica, alumina, silica alumina, quick lime, magnesia, titania, triirontetraoxide, zirconia, and calcium carbonate by the use of a catalyst containing (A) a titanium compound and (B) aluminoxane as main components.

2. The process of claim 1, wherein the filler is used in an amount of more than 20% up to 85% by weight based on the total product weight of the composition.

3. The process of claim 1, wherein the filler is used in an amount of 0.1 to 20% by weight based on the total product weight of the composition.

4. The process of claim 3 wherein 0.5 to 15% by weight of filler is used.

5. The process of claim 1 wherein the filler is used in an amount of 1 to 50% by weight based on the total produce weight of the composition.

6. The process of claim 1 wherein the filler is spherical and has an average diameter of 0.01 to 200 μm.

7. The process of claim 1 wherein the filler is fibrous, has an average diameter of 0.1 to 10,000 μm and a length/diameter ratio of 10 to 2,000.

8. The process as claimed in claim 1 wherein (B) aluminoxane is methylaluminoxane.

* * * * *

UNITED STATES PATENT AND TRADEMARK OFFICE
CERTIFICATE OF CORRECTION

PATENT NO. : 5,212,232

DATED : May 18, 1993

INVENTOR(S) : Masahiko Kuramoto et al.

It is certified that error appears in the above-identified patent and that said Letters Patent is hereby corrected as shown below:

On the title page, Item [30],

The PCT Information has been omitted from the Foreign Application Priority Data, should read: --Sep. 24, 1988 [PCT]  PCT....PCT/JP88/00973--

Signed and Sealed this

Twenty-eighth Day of December, 1993

Attest:

BRUCE LEHMAN

*Attesting Officer*    Commissioner of Patents and Trademarks